United States Patent [19]

Ando et al.

[11] Patent Number: 4,884,182

[45] Date of Patent: Nov. 28, 1989

[54] CURRENT SOURCE POWER CONVERTING APPARATUS WITH OVERVOLTAGE PROTECTION

[75] Inventors: Takeki Ando, Naka; Kiyoshi Nakamura, Katsuta; Toshisuke Mine, Katsuta; Hiromi Inaba, Katsuta; Toshiaki Kurosawa, Katsuta; Masao Nakazato, Katsuta; Yoshio Sakai, Naka, all of Japan

[73] Assignee: Hitachi, Ltd., Tokyo, Japan

[21] Appl. No.: 184,048

[22] Filed: Apr. 20, 1988

[30] Foreign Application Priority Data

Apr. 22, 1987 [JP] Japan ................................ 62-97359

[51] Int. Cl.⁴ ............................................. H02H 7/10
[52] U.S. Cl. ...................................... 363/37; 363/51; 363/53; 363/56; 361/91; 361/111
[58] Field of Search ................. 363/34, 35, 37, 50–58; 361/18, 20,-21, 23, 29, 30, 33, 90, 91, 111, 118

[56] References Cited

U.S. PATENT DOCUMENTS

| | | | |
|---|---|---|---|
| 4,015,170 | 3/1977 | Barakaev et al. | 363/51 X |
| 4,553,197 | 11/1985 | Stemmler | 363/37 |
| 4,672,520 | 6/1987 | Ueda et al. | 363/37 |
| 4,721,897 | 1/1988 | Matsuse et al. | 363/37 X |
| 4,757,436 | 7/1988 | Ueda et al. | 361/91 X |

OTHER PUBLICATIONS

"Configuration and Characteristics of the GTO Converter Using Regenerative Voltage Clipper Circuit", Ise et al., Journal of Institute of Electric Engineers of Japan, vol. 106, No. 9, (1986), pp. 25–32.

Primary Examiner—Patrick R. Salce
Assistant Examiner—Emanuel Todd Voeltz
Attorney, Agent, or Firm—Antonelli, Terry & Wands

[57] ABSTRACT

In a current source power converting apparatus, in which an AC to DC converter is coupled to a DC to AC inverter through a DC reactor, two energy absorbing devices are coupled to DC terminals of the converter and the inverter, respectively, whereby there is formed a circulation circuit for circulating a current through the two energy absorbing devices and the DC reactor, when a voltage, which is higher than a predetermined value, is induced by an inductance of the DC reactor.

12 Claims, 6 Drawing Sheets

SOURCE VOLTAGE

BASE SIGNALS OF TRANSISTORS OF CONVERTER 3

CURRENT THROUGH CAPACITOR 21

VOLTAGE ACROSS CAPACITOR 21

OUTPUT OF OVERVOLTAGE DETECTOR 51

CURRENT SOURCE POWER CONVERTING APPARATUS WITH OVERVOLTAGE PROTECTION

BACKGROUND OF THE INVENTION

1. Field of the Invention

The present invention relates to a current source power converting apparatus with an improved overvoltage protection, and especially to an improvement of an overvoltage protection of a current source power converting apparatus having an AC to DC converter and a DC to AC inverter coupled with the converter through a DC reactor.

2. Description of the Related Art

Recently, a current source power converting apparatus has widely been employed in order to control an AC load, for example an induction motor. As is well known, a current source power converting apparatus has an AC to DC converter and a DC to AC inverter, in which the AC to DC converter is composed of semiconductor switching elements which repeat turning on or off to convert AC power supplied by an AC power source into DC power and the DC to AC inverter is also composed of semiconductor switching elements which repeat turning on or off to reconvert the DC power into AC power to be supplied for an AC load such as an induction motor. Further, there is provided a DC reactor between the converter and the inverter, whereby a constant DC current is supplied for the inverter.

In such a current source power converting apparatus, when the switching elements of the converter or the inverter are turned off during of the switching operation thereof, or when any of the switching elements, through which current is now flowing, is abnormally made off, current flowing through a circuit of the power converting apparatus is abruptly interrupted and thereby a high voltage is induced by inductance existing in the circuit. Inductance exists in an AC side of the circuit, i.e. in an AC power source and an AC load, as well as the DC reactor. The high voltage thus induced is applied to circuit components and, especially, when such a high voltage becomes an overvoltage of the switching elements they may be destroyed.

Conventionally, there has not been proposed an appropriate protection for a current source power converting apparatus as described above, which can effectively prevent semiconductor switching elements from being destroyed due to the overvoltage. For example, in an article entitled "Configuration and Characteristics of the GTO Converter Using Regenerative Voltage Clipper Circuit" by Ise et al (Journal of Institute of Electric Engineers of Japan, Vol. 106 No. 9 (1986) p.p. 25 to 32), there is disclosed an overvoltage protection of gate turn-off thyristors of a converter, which controls current supplied for a coil of a superconductive magnetic energy by converting AC power into DC power.

In such a converter, a high voltage is induced by leakage inductance on the AC side or that of the coil, when GTO is turned off. According to the aforesaid prior art, the induction of such a high voltage is suppressed by absorbing the energy stored in the inductance by an energy absorbing circuit coupled to a DC side of the converter. When GTO is turned off, the energy stored in the inductance is discharged to make current circulate through the energy absorbing circuit, the coil (load), the converter and the AC power source, with the result that during the circulation of the current, the energy is absorbed by the energy absorbing circuit.

As disclosed in the prior art mentioned above, in the case where a load such as coil is coupled to a converter, current for discharging the energy stored in inductance of a circuit can always circulate automatically through the load, when GTO is turned off or when GTO is made off abnormally. If, however, an inverter is coupled to the converter as a load, such current can circulate only when the inverter operates normally. If GTOs of both the converter and the inverter are made off abnormally at the same time, a circulation circuit for discharging the stored energy is no longer formed. If the stored energy can not discharged, a high voltage is induced and applied to GTOs, so that they may be destroyed due to an overvoltage. The prior art mentioned above does not provide any effective countermeasures thereagainst.

SUMMARY OF THE INVENTION

It is an object of the present invention to provide an improved overvoltage protection in a current source power converting apparatus comprising a converter for converting AC power fed by an AC power source into DC power, an inverter for inverting the converted DC power into AC power supplied for an AC load and a DC reactor provided between the converter and the inverter, through which the inverter is fed with the converted DC power.

A feature of the present invention resides in that in such a current source power converting apparatus, there are provided two energy absorbing means, each comprising a rectifier and an energy absorbing element coupled across DC output terminals of the rectifier, AC input terminals of a rectifier of one of which energy absorbing means are coupled to AC input terminals of the converter and DC output terminals thereof are coupled across DC output terminals of the converter through diodes, and AC input terminals of a rectifier of the other of which energy absorbing means are coupled to AC output terminals of the inverter and DC output terminals thereof are coupled across DC input terminals of the converter through diodes, whereby there is formed a circuit, which includes the two energy absorbing means and the DC reactor and through which current can circulate, when voltage larger than a first predetermined value is induced by inductance existing within a circuit of the power converting apparatus.

With the present invention, a circuit for discharging the energy stored in inductance existing within a circuit of a power converting apparatus can always be established, whereby even if semiconductor switching elements of a converter and an inverter are made off abnormally at the same time, the energy stored in the inductance is discharged and therefore an overvoltage is never applied to the semiconductor switching elements.

According to one of detailed features of the present invention, there is provided overvoltage detecting means for detecting that voltage appearing across the energy absorbing element included in at least one of the two energy absorbing means which exceeds a second predetermined value. By using an output of the overvoltage detecting means, there can be realized various protections capable of further backing up the overvoltage protection as mentioned above.

Further, according to another detailed feature of the present invention, there is provided voltage supplying means for supplying voltage for the energy absorbing element included in at least one of the two energy absorbing means preceding the operation of the power converting apparatus, so that the voltage of the energy absorbing element is maintained at a desired value, which is smaller than the second predetermined value, but larger than the first predetermined value. By maintaining the voltage of the energy absorbing element at such a value, it is possible to prevent a rush current from flowing into the energy absorbing element when the power converting apparatus starts the operation.

According to still another detailed feature of the present invention, there is provided regenerative means in at least one of the two energy absorbing means, which regenerates the energy stored in the energy absorbing element to an AC power source when the voltage of the energy absorbing element exceeds the second predetermined value. With this, the distortion in the waveform of voltage and current on an AC side can be much improved.

Other detailed features and advantage of the present invention will become apparent from the description in the specification carried out with reference to accompanying drawings and will be particularly pointed out in the claims.

DESCRIPTION OF THE PREFERRED EMBODIMENTS

In the following there will be given the detailed explanation of some forms embodying the present invention, with reference to the figures.

Figure 1:
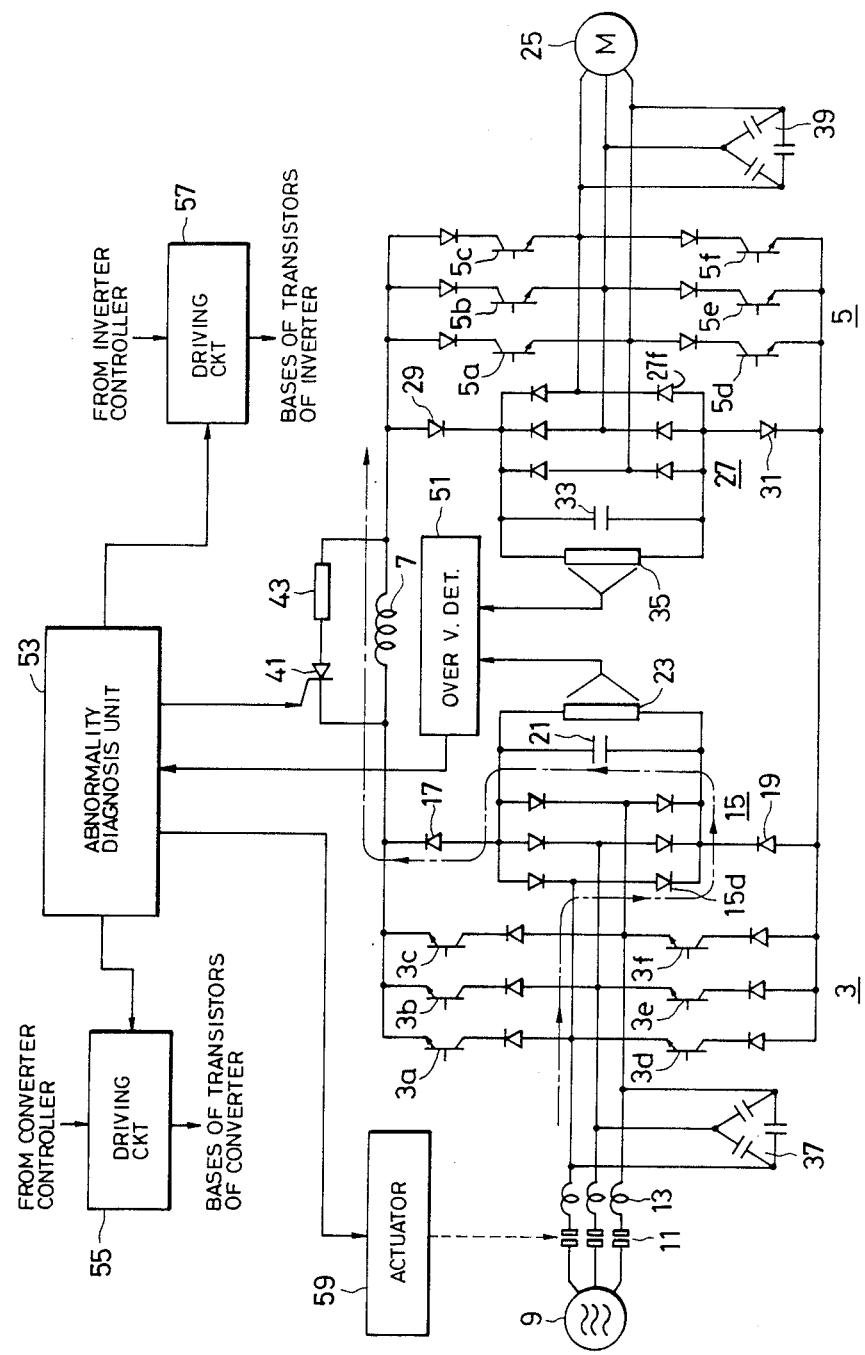
FIG. 1 schematically shows an overall configuration of a current source power converting apparatus according to an embodiment of the present invention.

Referring at first to FIG. 1, there is shown an overall configuration of a current source power converting apparatus according to an embodiment of the present invention, in which a converter 3 is coupled to an inverter 5 through a DC reactor 7. The converter 3 is composed of transistors 3a to 3f connected in the Gratz connection and diodes connected in series with the respective transistors and fed with AC power by an AC power source 9 through a contactor 11 and reactors 13.

There is provided a three phase, full-wave rectifier 15 in parallel with the converter 3 with respect to the AC power source 9. Both DC output terminals of the rectifier 15 are connected to DC output terminals of the converter 3 through diodes 17, 19, respectively. A capacitor 21 is connected across the DC output terminals of the rectifier 15. The capacitor 21 functions as an energy absorbing element for absorbing the energy stored in inductance existing in a circuit of the power converting apparatus (called circuit inductance, hereinafter), as described later. A resistor 23 is further connected in parallel with the capacitor 21 in order to consume the energy absorbed in the capacitor 21. Namely, with these, there is formed energy absorbing means.

The inverter 5 is composed of transistors 5a to 5f connected in the Gratz connection and diodes connected in series with the respective transistors. DC input terminals of the inverter 5 are coupled to the DC output terminals of the converter 3 through the DC reactor 7, and AC output terminals thereof are coupled to an AC load, i.e., an AC motor in the figure.

A three phase, full-wave rectifier 27 is connected in parallel with the AC output terminals of the inverter 5 with respect to the load 25. Both DC output terminals of the rectifier 27 are connected to the DC input terminals of the inverter 5 through diodes 29, 31, respectively. A capacitor 33 is connected across DC output terminals of the rectifier 27. The capacitor 33 functions as an energy absorbing element for absorbing the energy stored in the circuit inductance. A resistor 35 is further connected in parallel with the capacitor 33 in order to discharge the absorbed energy thereto. Both the DC output terminals of the rectifier 27 are connected to the DC input terminals of the inverter 5 through diodes 29, 31, respectively. With these, there is formed another energy absorbing means.

The DC reactor 7 is provided with a discharging circuit consisting of a switch 41 and a resistor 43. When the switch 41 is made on, the energy stored in the DC reactor 7 is discharged to the resistor 43 and consumed therein. The switch 41 is switched on by a protection signal described later.

Both the AC input terminals of the converter 3 and the AC output terminals of the inverter 5 are provided with capacitors 37, 39, respectively. Although the capacitors 37, 39 are actually provided with resistors for suppressing a rush current when they are initially charged, those resistors are omitted in the figure.

The voltages of the capacitors 21, 33 are detected from both ends of the resistors 23, 35. The detected signals are coupled to an overvoltage detector 51, which produces an output signal when either the detected signal from the resistor 23 or that from the resistor 35 exceeds a predetermined value. The output signal of the overvoltage detector 51 is coupled to an abnormality diagnosis unit 53.

The unit 53 can usually be realized by functions of a microprocessor for controlling various operations for the power converting apparatus. The unit 53 produces various protection signals on the basis of the output signal from the overvoltage detector 51. One of the protection signals is a signal for switching on the switch 41. Other protection signals are signals which are given to driving circuit 55, 57 for the converter 3 and the inverter 5.

The driving circuits 55, 57 amplify base signals from a converter controller and an inverter controller (both not shown) and apply the amplified signals to the respective resistors of the converter 3 and the inverter 5. When the signal from the unit 53 is applied to the driving circuits 55, 57, the base signals are interrupted so that the converter 3 and the inverter 5 stop their operation.

A last protection signal produced by the unit 53 is a signal coupled to an actuator 59 for operating the contactor 11. The actuator 59 makes the contactor 11 off in response to the signal from the unit 53.

Figure 3A:
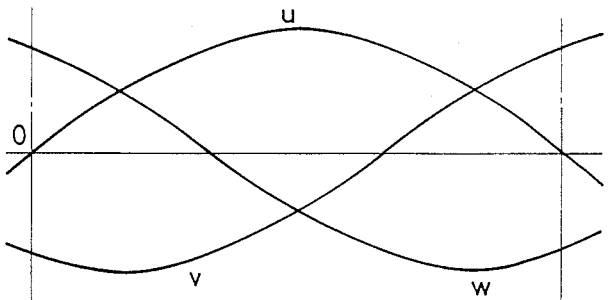
FIG. 3a to 3e show the waveforms of signals and the changing manner of amounts of various portions in the apparatus of FIG. 1.
Figure 3B:
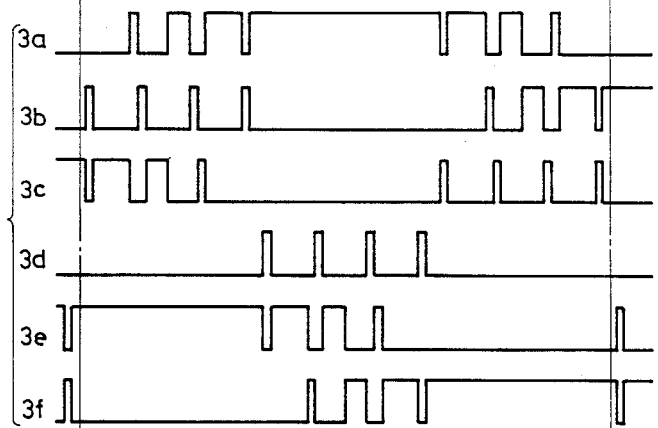

Referring next to FIGS. 3a to 3e, the explanation will be given of the operation of the circuit shown in FIG. 1. In FIG. 3a, there are shown waveforms of voltages of three phases u, v and w of the AC voltage source 9, with respect to only a half cycle of the u phase voltage. In FIG. 3b, there are shown base signals for the respective transistors 3a to 3f. The base signals in this embodiment are generated on the pulse width modulation (PWM) control basis. Since, however, a control method itself of the converter 3 has nothing to do with the essence of the present invention, further description thereof is omitted here.

Figure 3C:
Figure 3D:
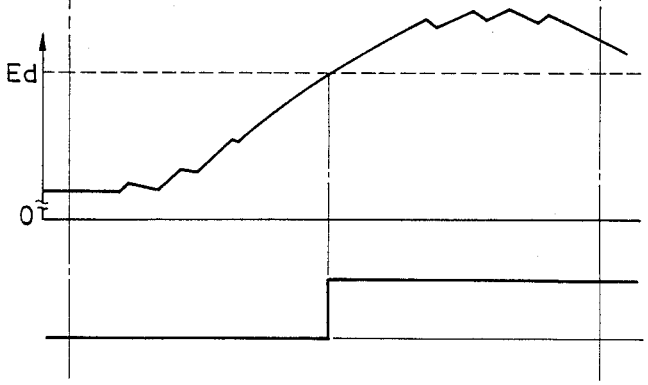
Figure 3E:
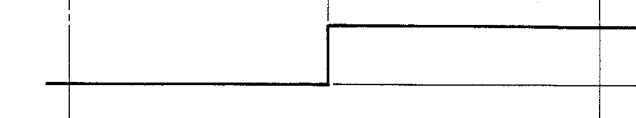

As the result that the converter 3 is controlled by the base signals as shown in FIG. 3b, a current as shown in FIG. 3c flows through the capacitor 21 and voltage thereof changes as shown in FIG. 3d. The voltage of the capacitor 21 increases gradually, and when it exceeds a voltage $E_d$, the overvoltage detector 51 produces an output signal as shown in FIG. 3e. The unit 53 watches a continuing time duration of the signal as shown in FIG. 3e or number of times of generation of that signal, and produces the protection signals as described above, when the time duration or the number of times of generation exceeds a predetermined value.

In the following, there will be described the operation of the overvoltage protection in the power converting apparatus shown in FIG. 1.

At first, the protection operation against the overvoltage induced by the DC reactor 7 is as follows. When any of the transistors 3a to 3f of the converter 3 is abnormally made off, a current flowing through the DC reactor 7 is interrupted, so that the energy stored in the DC reactor 7 is discharged through a circuit of the DC reactor 7 - the diode 29 - the capacitor 33 - the diode 31 - the diode 19 - the capacitor 21 - the diode 17 - the DC reactor 7. Namely, the current caused by the energy stored in the DC reactor 7 circulates through the aforementioned circuit, whereby the energy stored in the DC reactor 7 is transferred to the capacitors 21, 33 and a high voltage is prevented from being induced in the DC reactor 7. The energy transferred to the capacitors 21, 33 is discharged to the resistors 23, 35, respectively and consumed therein. That is, the energy stored in the DC reactor 7 is absorbed by the two energy absorbing means each composed of the rectifier 15, 27, the capacitor 21, 33 and the resistor 23, 35. The same as described above is applied, when any of the transistors 5a to 5f of the inverter 5 is abnormally made off. Further, also when the transistors of both the converter 3 and the inverter 5 are abnormally made off at the same time, a high voltage is prevented from being induced in the same manner as described above. In any event, the energy stored in the DC reactor 7 is consumed by a circulating circuit including the two energy absorbing means, whereby a high voltage induced therein is suppressed.

Next, the energy stored in the circuit inductance in the AC power source side including the reactor 13 and the AC load side, i.e., 25, is consumed as follows. When any of the transistors 3a to 3f of the converter 3, for example the transistor 3a, is abnormally made off, a current having flowed through the transistor 3a is commutated to a circuit as shown by a chain line in the figure, i.e., through a circuit of the power source 9 - the rectifier 15 (diode 15d) - the capacitor 21 - the diode 17 - the DC reactor 7 - the diode 29 - the capacitor 33 - the diode 31 - the converter 3 (either of the transistors 3e or 3f) - the power source 9. Further if any of the transistors 5a to 5f of the inverter 5, for example the transistor 5a, is abnormally made off, a current having flowed through the transistor 5a is commutated to the diode 29, and thereafter continues to flow through a circuit of the diode 29 - the capacitor 33 - the rectifier 27 (diode 27f) - the motor 25 - the inverter 5 (either of the transistors 5e or 5f) - the diode 19 - the capacitor 21 - the diode 17 - the DC reactor 7 - the diode 29.

Through the former circulating circuit, the energy stored in the circuit inductance of the AC power source side is transferred to the capacitors 21, 33. Similarly, the energy stored in the circuit inductance of the AC load side is transferred to the capacitors 21, 33. In both cases, the energy transferred to and stored in the capacitors 21, 23 is discharged to the resistors 23, 35, respectively, and consumed therein. Even if, therefore, the transistor of the converter 3 and the inverter 5 is abnormally made off, the energy stored in the circuit inductance of both the AC power source side and the AC load side can be effectively consumed so that the generation of a high voltage is prevented.

By the way, as is well known, in the power converting operation of the converter 3 or inverter 5, the transistors thereof are forcibly commutated. A high voltage is sometimes generated by the stored energy of the circuit inductance of both the AC power source side and the AC load during the forcible commutation mentioned above. This means that a current flows into the energy absorbing means during the normal operation of the power converting apparatus, too, and circuit components of the energy absorbing means must have a large capacity comparable to that of the converter 3 and the inverter 5.

Since, however, there are actually provided in many cases capacitors 37, 39 both at AC output terminals of the converter 3 and at AC output terminals of the inverter 5, respectively, a large current does not flow into the capacitors 21, 33 of the energy absorbing means during the normal operation of the power converting apparatus. In the case where there are provided the capacitors 37, 39, therefore, circuit components of the energy absorbing means are not necessary to have a large capacity. It can be said that the energy absorbing means and the capacitors 37, 39 share the function of absorbing the energy stored in the circuit inductance of an AC circuit, namely, the former absorbs the energy discharged when any of the transistors of the converters 3 and the inverters 5 is abnormally made off, and the latter absorbs the energy discharged during the commutation of the normally operating transistors of the converter 3 and the inverter 5. In this sense, the capacitors 37, 39 can be also called energy absorbing means.

Figure 2:
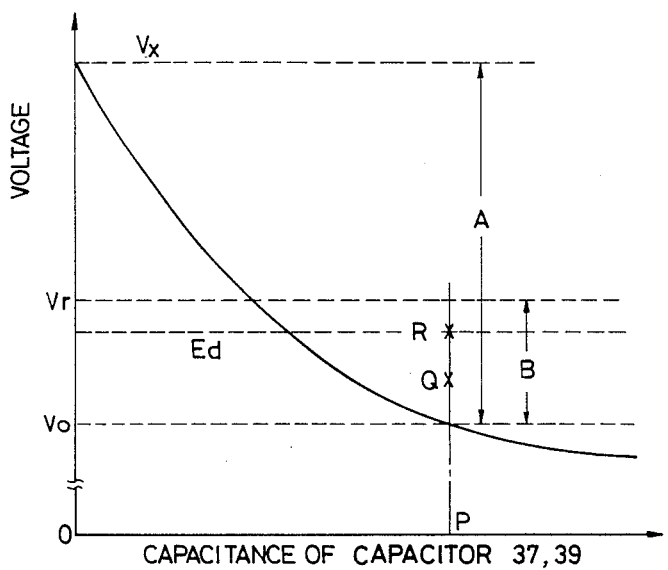
FIG. 2 is a graph for explaining the operation of the overvoltage protection in accordance with the embodiment of FIG. 1.

A curve in FIG. 2 shows the relation between the capacitance of the capacitor 37, 39 and the voltage induced by the circuit inductance at the time of the commutation in the normal operation.

As apparent from the figure, unless the capacitor 37, 39 are provided, the voltage induced by the circuit inductance is as high as $V_x$ which remarkably exceeds a transistor rated voltage $V_r$. Such a voltage $V_x$ causes the breakdown of the transistors. If there are provided the capacitors 37, 39 of the capacitance as indicated by point P, the voltage induced by the circuit inductance upon the commutation of the transistors is reduced to the voltage $V_o$; in other words, it can be considered that the voltage indicated by range A, i.e. $V_x - V_o$, is absorbed by the capacitors 37, 39. When, under such a condition, the power converting apparatus continues to operate normally, a voltage $V_o$ appears across the transistors. In this sense, the voltage $V_o$ can be called an operating voltage of the transistors. If a voltage as indicated by point Q is induced by the abnormal interruption of current flowing through any of the transistors, the voltage as indicated by point Q appears across the transistors. This voltage is considerably small, compared with the voltage $V_x$. Therefore, the rectifiers 15, 27 and the capacitors 21, 33 of the energy absorbing means are sufficient to have the capacity enough to absorb such a considerably small voltage. In this manner, the range, in which the protection by the energy absorbing means functions, is as indicated by range B, i.e. from the voltage $V_o$ to the rated voltage $V_r$ of the transistors. Further, the detection level of the overvoltage detector 51 is set as indicated by point R, i.e. $E_d$.

As described above, the energy stored in the circuit inductance including the DC reactor is transferred to the capacitors 21, 33 of the energy absorbing means and consumed by the resistors 23, 35 connected to the capacitors 21, 33. For example, however, if an amount of the energy stored in the DC reactor 7 is large and hence the capacitors 21, 33 can not absorb it perfectly, the capacitor voltage rises, which is detected by the overvoltage detector 51. The detection signal of the overvoltage detector 51 initiates the abnormality diagnosis unit 53, which produces one of the protection signals. The protection signal switches on the switch 41, whereby the energy stored in the DC reactor 7 is consumed by the resistor 43. As a result, the further transfer of the energy stored in the DC reactor 7 to the capacitors 21, 33 is prevented, and the increase of the capacitor voltage is suppressed.

Further, the unit 53 produces the other protection signals to the driving circuits 55, 57, which interrupt the base signals to stop the operation of the converter 3 and the inverter 5. Thereby, the power converting apparatus can be prevented from being destroyed as a whole, and therefore a highly reliable power converting apparatus can be realized.

Figure 4:
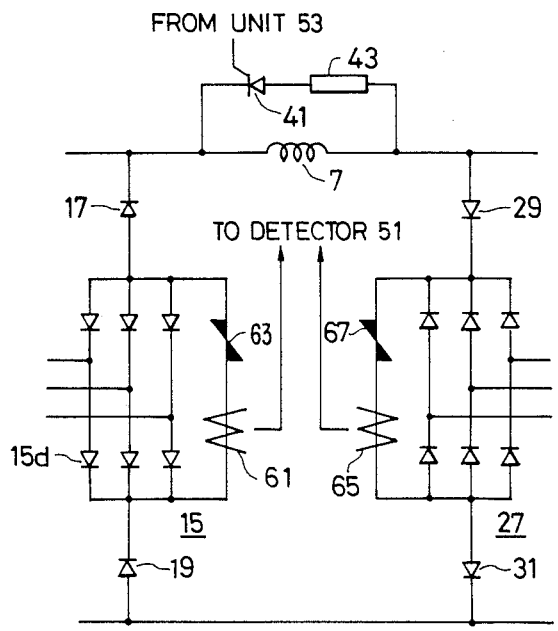
FIG. 4 shows a part of a modification of the embodiment of FIG. 1.

In the embodiment described above, it is to be noted that the capacitors 21, 33 are charged till the voltage $V_o$ during the normal operation of the power converting apparatus, and therefore the energy absorbing means start to first function when the voltage caused by the circuit inductance exceeds the voltage $V_o$. The function mentioned above can be substituted by a circuit arrangement as shown in FIG. 4, in which there is shown a part of a modification of the embodiment of FIG. 1.

Namely, current detectors 61, 65 and non-linear resistance elements 63, 67 such as varistor substitute for the capacitors 21, 35 and the voltage detectors for detecting the voltage appearing thereacross in FIG. 1. The voltage of the varistors 63, 67 is selected at an appropriate voltage between $V_o$ and $E_d$ in FIG. 2. When the voltage caused by the circuit inductance exceeds the selected voltage of the varistors 63, 67, current starts to flow therethrough and the detectors 61, 65 detect the current to produce output signals, whereby the combination of the current detector 61, 65 and the varistors 63 67 can attain the same function as the relevant portions in FIG. 1.

Figure 5:
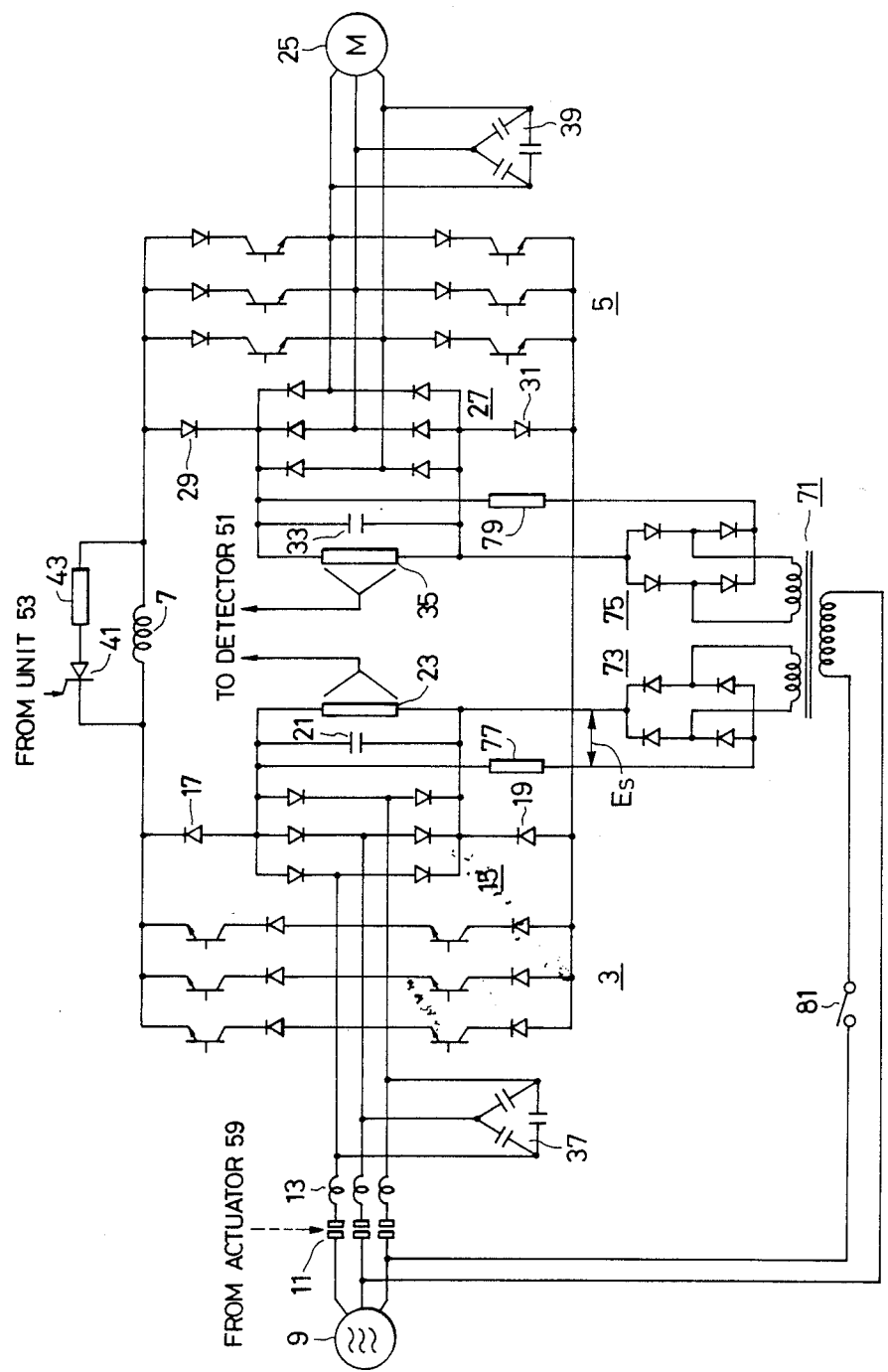
FIG. 5 schematically shows the configuration of a current source power converting apparatus according to another embodiment of the present invention.

Referring next to FIG. 5, there will be explained a power converting apparatus according to another embodiment of the present invention, according to which the malfunction liable to occur in the time of the start of operation can be effectively prevented.

In the circuit arrangement as shown in FIG. 1, a large charging current, which is substantially equal to a short-circuit current, flows into the capacitor 21 of the energy absorbing means, when the contactor 11 is closed because the capacitor 21 does not have any charge therein. As a result, the voltage at the AC input terminals of the converter 3 is reduced down to an extremely low voltage. Various control devices of the power converting apparatus take electric power thereinto on the side of the AC input terminals of the converter 3, and therefore the extreme reduction of voltage as described above makes the control devices unable to cause the malfunction of the power converting apparatus.

As apparent from FIG. 5, in this embodiment, there is added to the embodiment of FIG. 1 voltage supply means for charging the capacitors 21, 33 before the start of operation of a power converting apparatus. Namely, there is provided a transformer 71 having two secondary windings. A primary winding of the transformer 71 is fed by the AC power source 9 through a switch 81, which is made on preceding the closure of the contactor 11. The two secondary windings are coupled to rectifiers 73, 75, respectively, each of which produces output voltage $E_s$, which is supplied to the capacitors 21, 33 through resistors 77, 79, respectively.

Figure 6:
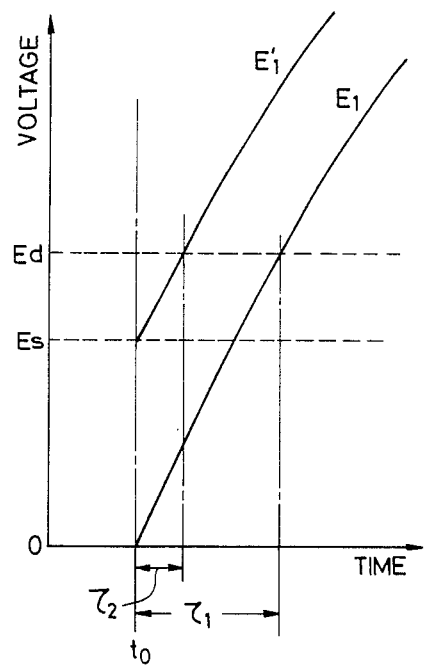
FIG. 6 is a graph for explaining the operation of a voltage supplying device used in the embodiment of FIG. 5.

According to this embodiment, a rush current is prevented from flowing into the capacitor 21 at the start of operation of the power converting apparatus, because the capacitor 21 is charged at the voltage $E_s$ in advance. Further this embodiment has the following advantage. As shown in FIG. 6, unless the capacitor 21 is charged in advance, the voltage thereof rises as shown by $E_1$ when the contactor 11 is closed at time point $t_o$. It takes time $\tau_1$ for the voltage $E_1$ to reach the detecting level $E_d$ of the overvoltage detector 51. On the other hand, in this embodiment, the voltage of the capacitor 21 increases as shown by $E_1'$, since the capacitor 21 is already charged at the voltage $E_s$ as described above. Therefore, a time in which the voltage $E_1'$ of the capacitor 21 reaches the detecting level $E_d$ becomes $\tau_2$, which is much smaller than $\tau_1$. This means that an overvoltage can be detected very quickly.

In FIG. 5, there have been provided the voltage supply means for both the capacitors 21 on the converter side and the capacitors 33 on the inverter side. However, the voltage supply means is sufficient to be provided only for either one of the capacitors 21 and 33; desirably for the capacitor 21 on the converter side, because a rush current flowing into the capacitor 33 on the inverter side seldom occurs.

Figure 7:
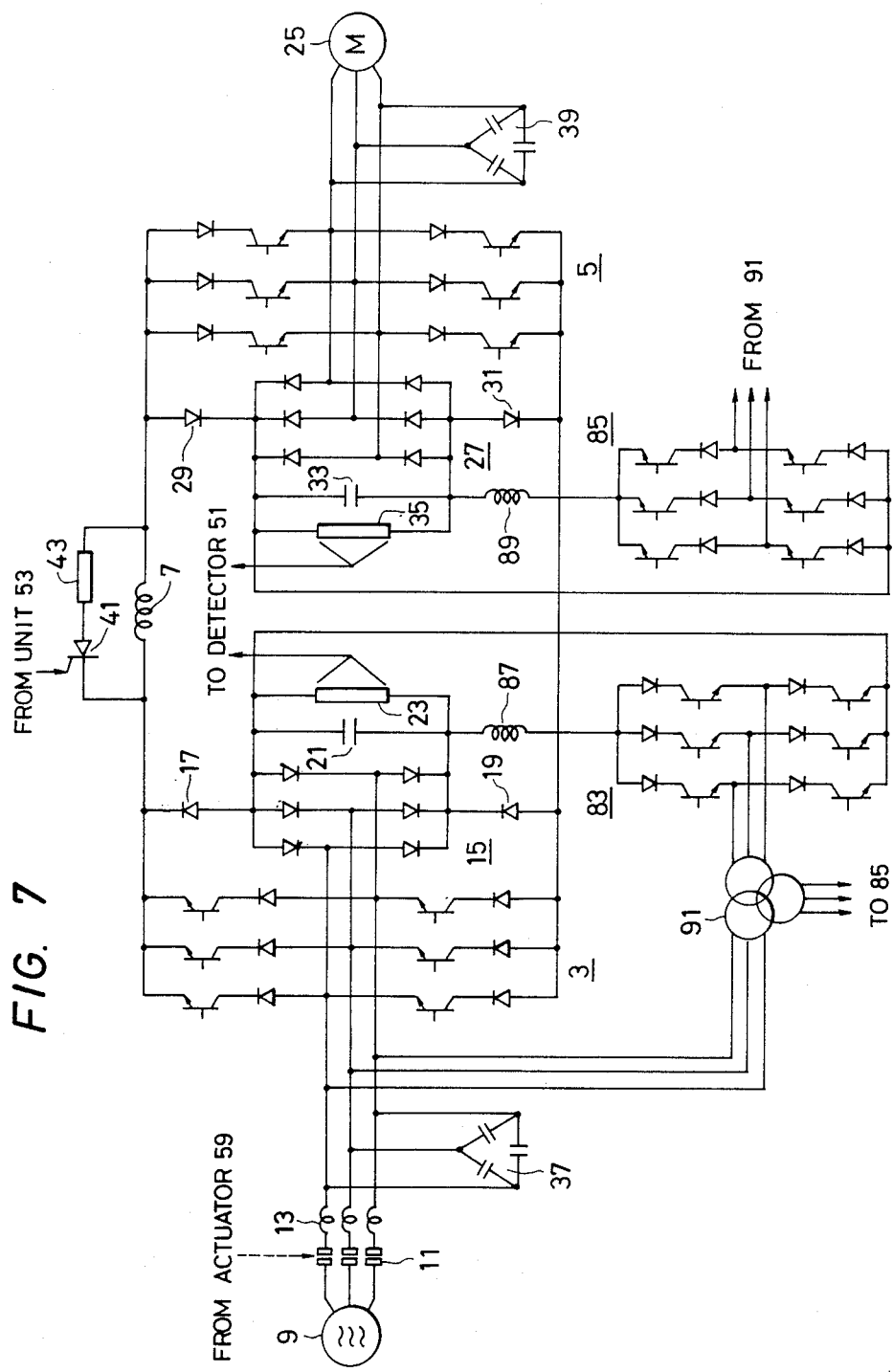
FIG. 7 schematically shows the configuration of a current source power converting apparatus according to still another embodiment of the present invention.

Referring further to FIG. 7, still another embodiment of the present invention will be explained in the following. Also in this embodiment, a major part thereof is the same as in the embodiment of FIG. 1. There is a difference only in that two additional inverters 83, 85 and a transformer 91 having two secondary windings are added to the embodiment of FIG. 1. DC terminals of the inverters 83, 85 are coupled to the capacitors 21, 33 through reactors 87, 89, respectively. AC terminals of the inverters 83, 85 are coupled to the secondary windings of the transformer 91, a primary winding of which is coupled to the AC input terminals of the converter 3.

Further, an additional inverter can be provided only on the converter side, for example, in the case where the rated voltage of the AC load 25 is low. Even if a high voltage is induced by the circuit inductance, there is a sufficient margin against the rated voltage of the transistor.

The additional inverters 83, 85 are controlled by respective controllers (not shown) so as to maintain their DC output terminals at a predetermined voltage, for example $E_s$. If, therefore, the voltage of the capacitors 21, 33 exceeds the voltage $E_s$, the energy stored therein is regenerated to the AC power source 9 through the additional inverters 83, 85 and the transformer 91. The operation for preventing a high voltage from being induced by the circuit inductance is the same as that of the already described embodiments of FIGS. 1 and 5. With this embodiment, the distortion of the of voltage and current waveforms on the power source side can be made small.

Figure 8:
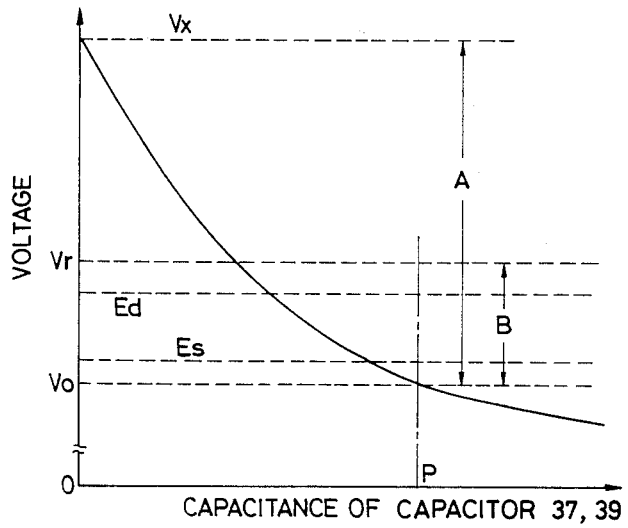
FIG. 8 is a graph for explaining the operation of the overvoltage protection in accordance with the embodiment of FIG. 5 or 7.

FIG. 8 shows the same relation as FIG. 2. As shown in the figure and similarly to the case of the embodiment of FIG. 5, the voltage $E_s$ is selected at a value higher than the operating voltage $V_o$ of the transistors, but lower than the detecting level $E_d$ of the overvoltage detector 51.

We claim:

1. A current source power converting apparatus comprising:
   converter means, fed by an AC power source through a contactor, for converting AC power into DC power;
   DC reactor means coupled in series with one of the DC terminals of said converter means;
   inverter means, fed by said converter means through said DC reactor means, for inverting the DC power into AC power to be supplied for an AC load,
   first energy absorbing means including a first rectifier having AC terminals coupled to AC terminals of said converter means and having DC terminals coupled between said DC reactor means and said converter means and in parallel with DC terminals of said converter means through diodes, and a first capacitor connected in parallel with the DC terminals of the first rectifier; and
   second energy absorbing means including a second rectifier having AC terminals coupled to AC terminals of said inverter means and having DC terminals coupled between said DC reactor means and said inverter means through diodes, and a second capacitor connected in parallel with the DC terminals of the second rectifier;
   whereby said first and second energy absorbing means and said DC reactor means form a circulation circuit through which current caused by energy stored in said DC reactor means can be circulated when voltage induced by said DC reactor means is higher than a first predetermined value.

2. A current source power converting apparatus as defined in claim 1, wherein there are further provided third energy absorbing means coupled to the AC terminals of said converter means, and fourth energy absorbing means coupled to the AC terminals of said inverter means.

3. A current source power converting apparatus as defined in claim 1, wherein there is further provided in at least one of said first and second energy absorbing means an overvoltage detector, which detects the voltage of at least one of said first and second capacitors and produces an overvoltage detection signal when the detected capacitor voltage exceeds a second predetermined value, which is larger than the first predetermined value.

4. A current source power converting apparatus as defined in claim 3, wherein there is provided an energy consuming circuit, coupled in parallel with said DC reactor means, for consuming the energy stored in said DC reactor means in response to the overvoltage detection signal.

5. A current source power converting apparatus as defined in claim 3, wherein the contactor is rendered off in response to the overlapping detection signal.

6. A current source power converting apparatus as defined in claim 3, wherein control signals to at least one of said converter and inverter means are interrupted in response to the overvoltage detection signal.

7. A current source power converting apparatus as defined in claim 3, wherein said overvoltage detector produces the overvoltage detection signal, when there are generated a predetermined number of pulse-like signals, each of which is produced when the voltage of at least one of said first and second capacitors is larger than the second predetermined value.

8. A current source power converting apparatus as defined in claim 3, wherein said overvoltage detector produces the overvoltage detection signal, when there continue to be generated pulse-like signals over a predetermined time, each of which is produced when the voltage of at least one of said first and second capacitors is larger than the second predetermined value.

9. A current source power converting apparatus as defined in claim 3, wherein there is further provided, at least in one of said first and second energy absorbing means, voltage supply means for maintaining the voltage of at least one of said first and second capacitors at a desired value, which is larger than the first predetermined value, but smaller than the second predetermined value.

10. A current source power converting apparatus as defined in claim 9, wherein said voltage supply means comprises a transformer fed by the AC power source through a switch and a rectifier for rectifying an output voltage of the transformer to output DC voltage of the desired value, in which the switch is closed before the contactor when the power converting apparatus is started.

11. A current source power converting apparatus as defined in claim 9, wherein said voltage supply means is provided at least in said first energy absorbing means coupled to said converter.

12. A current source power converting apparatus as defined in claim 3, wherein there is further provided, at least in one of said first and second energy absorbing means, regenerating means for regenerating the energy stored in the capacitor of the one of said first and second energy absorbing means to the AC power source, when the capacitor voltage exceeds a desired value, which is larger than the first predetermined value, but smaller than the second predetermined value.

* * * * *